United States Patent Office 2,941,423
Patented June 21, 1960

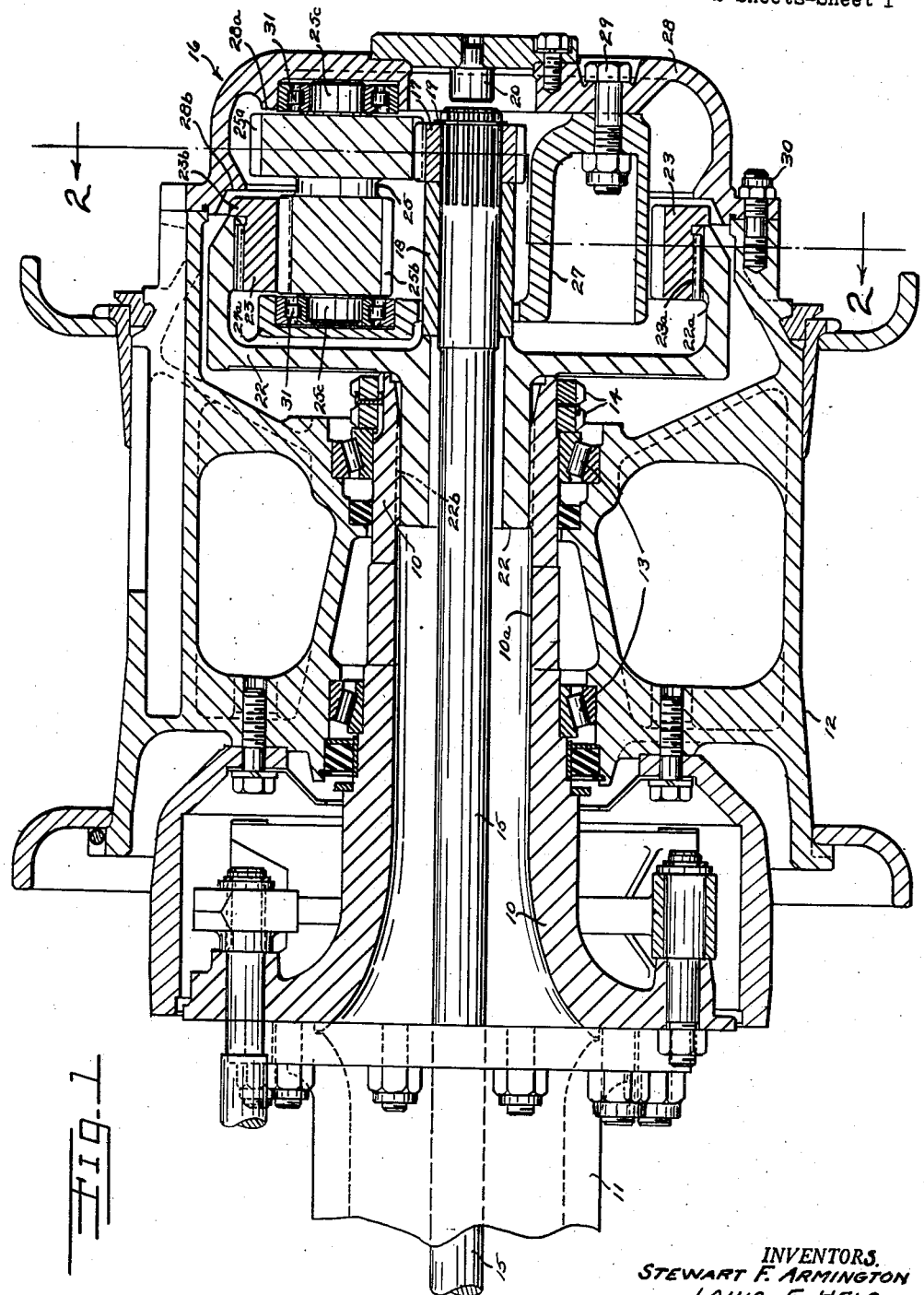

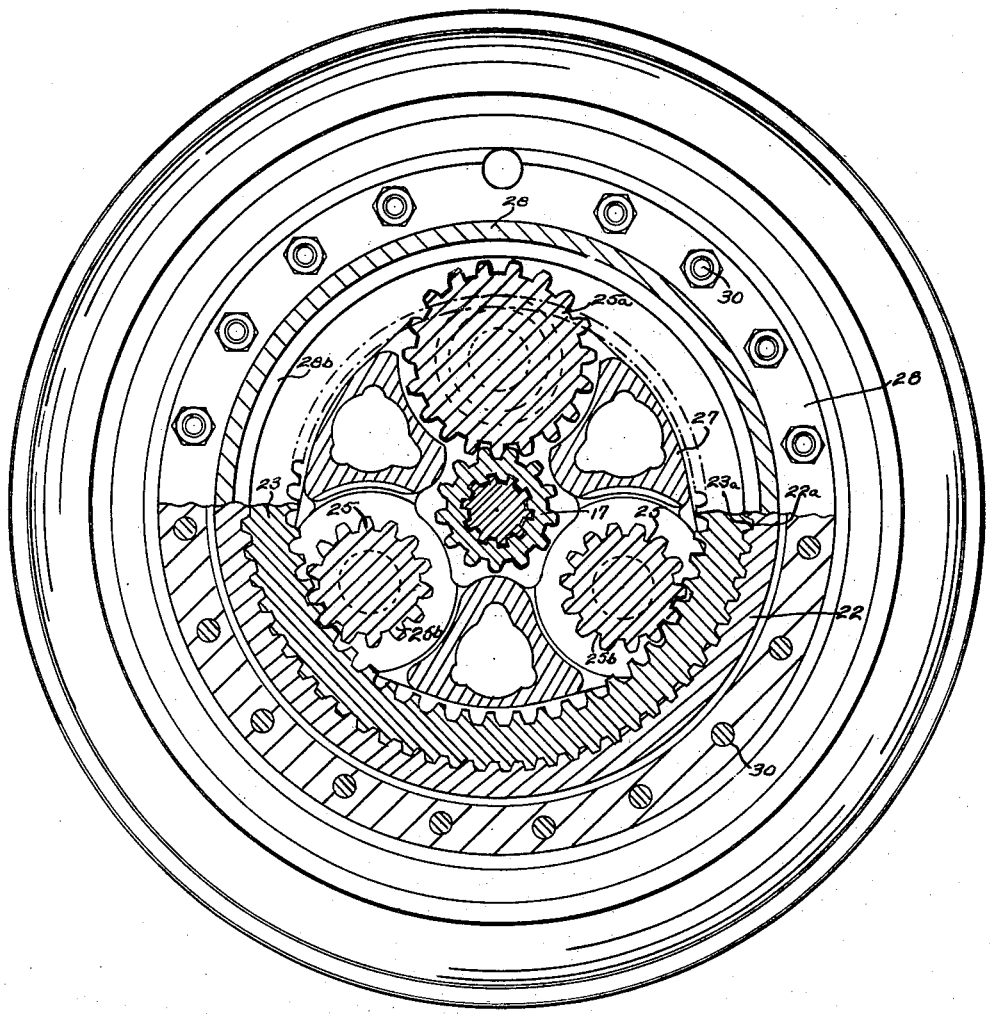

2,941,423

COMPOUND PLANETARY GEAR DRIVE

Stewart F. Armington, Willoughby, and Louis F. Held, Mayfield Heights, Ohio, assignors, by mesne assignments, to General Motors Corporation, Detroit, Mich., a corporation of Delaware Filed July 2, 1953, Ser. No. 365,580

3 Claims. (Cl. 74—801)

This invention relates to improvements in a planetary gear drive and more particularly to one of the compound planetary type.

One of the objects of the present invention is to provide a compound planetary gear drive providing a large speed reduction for driving a wheel on a vehicle of the off-the-highway type or any other equivalent structure.

Another object of the present invention is to provide a planetary gear drive characterized by its structural simplicity, ease of assembling its parts, ease of servicing by assembly and disassembly of the parts, and its strong and sturdy nature.

Other features of this invention reside in the arrangement and design of the parts for carrying out their appropriate functions.

Other objects and advantages of this invention will be apparent from the accompanying drawings and description and the essential features will be set forth in the appended claims.

In the drawings,

Fig. 1 is a longitudinal sectional view through a drive wheel on its supporting frame driven by its axle through the compound planetary gear drive of the present invention; while Fig. 2 is a vertical or transverse sectional view through the compound planetary gear drive taken along the line 2—2 in Fig. 1.

Those familiar with this art will recognize that this planetary gearing invention may be applied in many ways, but it has been chosen to illustrate the same as a compound planetary gearing for rotating a drive wheel wherein a large speed reduction is required, such as on a heavy duty, off-the-highway vehicle.

In this type of heavy vehicle, it is necessary to obtain a greater reduction than is possible with the single, plain planetary so that a compound planetary arrangement is required.

In Fig. 1, a wheel supporting frame or spindle 10 is secured to an axle housing 11 by bolts, studs or any other suitable securement means with this axle housing 11 also suitably secured to the vehicle body. A wheel 12 is rotatably mounted on the wheel supporting frame 10 by a pair of bearings 13 suitably secured between endwise locating shoulders by a lock washer and nut unit 14 screwed onto outside diameter threads on the wheel supporting frame 10. Axle or drive shaft 15 extends outwardly (toward the right in Fig. 1) through a central bore 10a in the frame 10 with the left end of the drive shaft 15 adapted to be connected to a power source on the vehicle for rotating the shaft about its longitudinal axis. A compound planetary type gear drive 16 is located at the outer end of the wheel and drivingly connects the drive shaft 15 to the wheel 12.

This planetary type gear drive has two functions. First, it provides a large speed reduction so that the vehicle motor will exert sufficient torque on the driving wheel 12. Second, the planetary type drive can be conveniently serviced without removing the wheel 12 from its supporting frame 10 so that the wheel will continually support the vehicle during the servicing operation. All of the parts in the planetary gear drive are removable during this servicing from the outside of the wheel (from the right in Fig. 1).

The planetary gear drive 16 includes a sun gear 17 splined onto the distal or right hand end of the drive shaft 15 so as to rotate with the drive shaft about the same axis. The sun gear is confined against substantial endwise movement by a tubular collar 18 bearing against the left side thereof, a snap ring 19 held by a groove in shaft 15, and an end stop button 20.

An internal gear member is provided comprising a ring gear 23 and a stationary ring gear carrier member 22. The carrier member 22 is secured at its left end by having a splined portion 22b telescoped from the right in Fig. 1 into a corresponding spline in the wheel supporting frame bore 10a with the carrier member 22 in abutting engagement with the right end of the frame 10. This splined connection prevents relative rotation between the parts but permits endwise removal of the carrier 22 from the outside of the wheel. The ring gear 23 is secured in the bore of the carrier member and has internal gear teeth arranged coaxial with, surrounding and radially spaced from shaft 15 and sun gear 17.

Cluster-type planet pinions 25, three in number and equally spaced circumferentially in Fig. 2, drivingly connect the sun gear 17 and the ring gear 23 with a much larger gear speed reduction than obtainable by a single, plain planetary pinion drive. Each cluster-type planet pinion 25 in Fig. 1 includes two, longitudinally or axially spaced, coaxial planet gears of different diameters 25a, 25b secured together as a cluster-type for synchronous rotation with planet gear 25a drivingly engaged with the sun gear 17 while planet gear 25b is drivingly engaged with the internal gear teeth on ring gear 23. The difference in the size of the cluster planet gears 25a, 25b gives a much greater speed reduction than a plain planetary drive with a single planet gear. It should be noted that the sun gear 17 is axially displaced from the plane of the ring gear 23 when in proper driving relationship with the planet pinions so as to align with planet gears 25a while planet gear 25b align with ring gear 23.

In the present disclosure, the planet gears 25a and 25b, as well as the endwise protruding axles or pins 25c, 25c extending from the opposite ends thereof, are all formed integrally as one solid member. However, it should be clearly apparent that each planet gear can be manufactured separately and then fixed to a central shaft providing the protruding rotatable support pins 25c, 25c.

A planet pinion carrier rotatably supports the three cluster-type planet pinions 25 with each pinion located at an equal distance from the axis of drive shaft 15, this distance remaining constant at all times during the operation of the planetary gearing. This planetary pinion carrier includes an inner member 27 in Fig. 1 and an outer member 28 detachably secured together by a plurality of circumferentially spaced bolts and nut units 29. In the present disclosure, the outer member 28 of this carrier serves as a cover for the planetary gearing and as a driving flange for connecting the compound planetary to the rotatably mounted wheel 12 by detachable stud and nut units 30 circumferentially spaced around the attaching flange of cover 28.

Spaced roller bearings 31, 31 are provided in the carrier members 27 and 28 for each cluster-type planet pinion 25 and are mounted respectively in roller bearing supporting boss portions 27a and 28a. Roller bearings 31 are needed here to resist the off-center loads created by the cluster-type planet pinions 25 with their axially spaced planet pinion gears 25a and 25b.

Making the boss portions 27a and 28a large enough and strong enough for suitably supporting the roller bearings 31 creates problems in assembly and disassembly of parts, since boss portion 27a has an outer surface located farther from the axis of rotation of shaft 15 than the inner bore of ring gear 23, as shown in Fig. 1. Making the ring gear 23 axially removable in the outward direction from its carrier member 22 permits easy disassembly. Interengageable splines 22a and 23a are provided respectively on carrier member 22 and ring gear 23 for this purpose, so that these parts are non-rotatably secured together but the ring gear can be detached therefrom by axial movement relative to the carrier in the outward direction. When they are assembled, as shown in Fig. 1, the internal teeth of the ring gear 23 are coaxial with the axis of rotation of drive shaft 15 and sun gear 17 with a radial flange 23b on the ring gear 23 coacting with the outer edge of the carrier member 22 to serve as an engageable stop means limiting axial inward movement of the ring gear 23. The internal spline 22a on the carrier member 22 has an internal radius greater than the outer dimension of boss portion 27a so as to permit ready disassembly of the parts toward the outward side of the wheel by movement of the parts axially toward the right in Fig. 1 after detachment of the fastening means. Of course, detachment of bolt and nut units 29 permits disassembly of the planet pinion carrier so that the ring gear 23 can be easily removed therefrom.

It should be understood that this invention includes in addition to the spline 22a, 23a any keyed or mating non-circular connecting surfaces permitting axial movement of ring gear 23 but preventing rotation between the ring gear 23 and its carrier member 22.

It should be noted that several coacting parts keep the gears properly aligned and in driving engagement. First, the sun gear 17 is properly located on the left by the collar 18, carrier member 22 and wheel supporting frame 10 with the coacting abutting shoulders shown in Fig. 1 and located on the right by snap ring 19, button 20, cover 28 and wheel 12. Second, ring gear 23 is prevented from sliding axially outwardly in Fig. 1 by an annular shoulder portion 28b on the cover 28 located outside of and in axial alignment with the ring gear stop flange 23b to prevent ring gear axial movement outwardly when cover 28 is properly secured onto wheel 12. Hence, ring gear 23 must stay in driving engagement with the planet gear 25b and must remain engaged with the carrier member 22 through the spline connection 22a, 23a.

Although the aforementioned construction is the desirable one, it may be possible to modify it slightly under some circumstances. For example, if the stop flange 23b were eliminated, the ring gear 23 would be kept in driving engagement with the planet gear 25b and kept secured to the carrier member 22 by the roller bearing supporting boss portion 27a and the shoulder portion 28b on the planet pinion carrier members 27 and 28 since they straddle the ring gear 23.

It should be apparent that the planetary gearing parts can all be disassembled without removing the wheel 12 from frame 10 so the vehicle is always supported thereby. The parts of Fig. 1 are disassembled by pulling them outwardly from the wheel and then separated from each other since the bolts and nuts as well as the splined connections are detachable.

Various changes in details and arrangement of parts can be made by one skilled in the art without departing from the spirit of this invention or the scope of the appended claims.

What is claimed is:

1. In a planetary-type wheel drive, a wheel supporting frame having a hollow bore, a wheel rotatably mounted thereon, a drive shaft extending outwardly through said bore in said frame and rotatable about its longitudinally axis, and a planetary type gear drive located at the outer end of said wheel and drivingly connecting said drive shaft and said wheel; said gear drive comprising a sun gear coaxially mounted on said drive shaft for rotation therewith, a ring gear having internal gear teeth surrounding and radially spaced from said sun gear, a ring gear carrier secured to said frame, axially detachable means between said ring gear and ring gear carrier non-rotatably mounting them together with said internal gear teeth coaxial with said sun gear, engageable stop means on said ring gear and ring gear carrier limiting axial inward movement of said ring gear, and a cover detachably secured to said wheel and supporting a planet pinion a constant distance from said axis, said cover having a portion located outside of and in axial alignment with said ring gear to coact with said stop means to prevent ring gear disengagement when said cover is secured.

2. In a planetary gearing for rotating a drive wheel, a sun gear rotatable about an axis, an internal gear member having a ring gear with internal gear teeth mounted coaxial with but axially displaced from said sun gear with said gear teeth surrounding and radially spaced from said sun gear, a planet pinion carrier rotatably supporting a cluster type planet pinion a constant distance from said axis, said cluster-type planet pinion having two axially spaced coaxial planet gears secured together for rotation together with one planet gear drivingly engaged with said sun gear and with the other planet gear drivingly engaged with said internal gear, and spaced roller bearings rotatably supporting said cluster-type planet pinion on said carrier to resist the off-center load of said cluster-type planet pinion, said planet pinion carrier comprising two planet members, said members having in assembled position surfaces closely straddling said ring gear to prevent axial detachment thereof with one of said surfaces being on one side of said ring gear in a transverse plane located axially intermediate said planet pinions, said planet pinion carrier comprising a fastening means detachably connecting said planet members together with said fastening means having a disassembling portion located outwardly from said outer planet member so that said planet members may be disassembled to release said ring gear by actuation of said disassembling portion.

3. In an assembly, as set forth in claim 2, with said internal gear member including a ring gear carrier and means connecting said ring gear and ring gear carrier for non-rotatable securement and detachable relative axial movement so that said straddling surfaces properly locate said ring gear in assembled position and can axially assemble or disassemble said ring gear with said ring gear carrier by movement of said planet members in opposite axial directions.

References Cited in the file of this patent

UNITED STATES PATENTS

| | | |
|---|---|---|
| 1,241,870 | Megow | Oct. 2, 1917 |
| 1,392,157 | Herman et al. | Sept. 27, 1921 |
| 1,464,887 | Starr | Aug. 14, 1923 |
| 1,820,061 | Flagg | Aug. 25, 1931 |
| 1,913,861 | Stahl | June 13, 1933 |
| 1,968,604 | Hertz et al. | July 31, 1934 |
| 2,258,008 | Hollatz | Oct. 7, 1941 |
| 2,284,047 | Edwards | May 26, 1942 |
| 2,399,319 | Bower et al. | Apr. 30, 1946 |
| 2,529,330 | Double | Nov. 7, 1950 |
| 2,543,811 | Snow | Mar. 6, 1951 |
| 2,672,739 | Wildhaber | Mar. 23, 1954 |
| 2,763,160 | Buckendale | Sept. 18, 1956 |

OTHER REFERENCES

G.E. Catalogue —"Tri-Clad" Gearing, March 1953, page 5 (GEA—1437H).